US012462250B2

(12) United States Patent
Agrawal et al.

(10) Patent No.: US 12,462,250 B2
(45) Date of Patent: Nov. 4, 2025

(54) MOBILE PAYMENTS USING MULTIPLE CRYPTOGRAPHIC PROTOCOLS

(71) Applicant: Visa International Service Association, San Francisco, CA (US)

(72) Inventors: Shashank Agrawal, Sunnyvale, CA (US); Dmitri Bannikov, Mountain View, CA (US); Atul Luykx, San Francisco, CA (US); Payman Mohassel, San Jose, CA (US); Sergey Smirnoff, Palo Alto, CA (US); Selvaganesh Vasudevan, Foster City, CA (US); Gaven Watson, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 1245 days.

(21) Appl. No.: 16/583,634

(22) Filed: Sep. 26, 2019

(65) Prior Publication Data
US 2020/0279258 A1  Sep. 3, 2020

Related U.S. Application Data

(60) Provisional application No. 62/812,757, filed on Mar. 1, 2019.

(51) Int. Cl.
*G06Q 20/40*   (2012.01)
*G06Q 20/38*   (2012.01)
*H04L 9/06*    (2006.01)

(52) U.S. Cl.
CPC ....... *G06Q 20/401* (2013.01); *G06Q 20/3829* (2013.01); *H04L 9/0625* (2013.01);
(Continued)

(58) Field of Classification Search
CPC ............. G06Q 20/401; G06Q 20/3829; G06Q 2220/00; G06Q 20/40975;
(Continued)

(56) References Cited

U.S. PATENT DOCUMENTS 11,922,428 B2 * 3/2024 Mestre .................. H04L 9/3066
2005/0188216 A1 * 8/2005 Crispin ................ H04L 9/0637
713/190

(Continued)

FOREIGN PATENT DOCUMENTS

GB          2525424        10/2015
WO       2013033388         3/2013
(Continued)

OTHER PUBLICATIONS

J Anderson, Puzzles and A Guide to Cryptograms, 2017 (Year: 2017).*

(Continued)

*Primary Examiner* — Tarek Elchanti
(74) *Attorney, Agent, or Firm* — Kilpatrick Townsend & Stockton LLP

(57) ABSTRACT

Systems, methods, and computer readable media are provided for improving the usability of a cryptogram generated in a first cryptographic protocol such as triple-DES. The methods may generate a first cryptogram using a first identifier in a first cryptographic protocol, stored in a key store within an insecure memory of the mobile communication device, generate, within a secure memory of the mobile communication device, a second cryptogram using a second identifier in a second cryptographic protocol, stored in the secure memory, combining, the first cryptogram and a number of characters of the second cryptogram equal to the length of the first cryptogram to generate a third cryptogram and transmitting the third cryptogram to an payment pro-
(Continued)

cessing network to validate a transaction. A transaction associated with the third cryptogram may be validated by an authorization entity or an issue entity.

19 Claims, 9 Drawing Sheets

(52) U.S. Cl.
CPC ....... *H04L 9/0631* (2013.01); *G06Q 2220/00* (2013.01); *H04L 2209/56* (2013.01)

(58) Field of Classification Search
CPC .......... G06Q 20/38215; G06Q 20/3227; H04L 9/0625; H04L 9/0631; H04L 2209/56
USPC .............. 705/75, 72, 71; 713/155, 171, 190; 380/30
See application file for complete search history.

(56) References Cited

U.S. PATENT DOCUMENTS

| | | | |
|---|---|---|---|
| 2012/0011070 A1* | 1/2012 | Ward | G06Q 20/34 705/72 |
| 2015/0088756 A1* | 3/2015 | Makhotin | G06Q 20/12 705/71 |
| 2015/0200774 A1* | 7/2015 | Le Saint | H04W 12/041 713/171 |
| 2015/0263858 A1* | 9/2015 | Aumasson | H04L 9/30 380/30 |
| 2016/0065370 A1* | 3/2016 | Le Saint | H04L 9/321 713/155 |
| 2016/0261409 A1* | 9/2016 | French | H04L 9/00 |
| 2017/0118026 A1* | 4/2017 | Yao | H04L 9/0861 |
| 2017/0272253 A1* | 9/2017 | Lavender | H04L 63/12 |
| 2017/0308895 A1 | 10/2017 | Srivastava | |
| 2017/0373852 A1 | 12/2017 | Cassin et al. | |
| 2018/0025353 A1* | 1/2018 | Collinge | G06Q 20/322 705/71 |
| 2018/0351729 A1* | 12/2018 | Tunstall | H04L 9/003 |
| 2020/0259651 A1* | 8/2020 | Mohassel | H04L 9/3218 |

FOREIGN PATENT DOCUMENTS

| | | | | |
|---|---|---|---|---|
| WO | WO-2014053589 A1 * | 4/2014 | .......... | H04L 9/0637 |
| WO | 2018136494 | 7/2018 | | |

OTHER PUBLICATIONS

Application No. EP20160142.4 , Office Action, Mailed On Feb. 2, 2022, 9 pages.
EMV, Integrated Circuit Card Specifications for Payment Systems, Book 2, Security and Key Management, Version 4.3, Nov. 2011, 174 pages.
EP20160142.4 , "Extended European Search Report", Jun. 4, 2020, 9 pages.
EP20160142.4 , "Intention to Grant", Jun. 7, 2024, 8 pages.

* cited by examiner

MOBILE PAYMENTS USING MULTIPLE CRYPTOGRAPHIC PROTOCOLS

CROSS-REFERENCE TO RELATED APPLICATIONS

This application claims priority to U.S. Provisional Patent Application No. 62/812,757, entitled "Mobile Payments using Multiple Cryptographic Protocols" and filed on Mar. 1, 2019, which is hereby incorporated by reference in its entirety for all purposes.

TECHNICAL FIELD

The present disclosure relates generally to payments between computing devices. More specifically, but not by way of limitation, this disclosure relates to performing mobile payments that utilize multiple cryptographic protocols to protect financial information.

BACKGROUND

In recent years there has been a significant emphasis on enabling payments on mobile communication devices. Companies often collaborate with Visa to ensure that payments are performed securely on all devices.

One of the primary techniques for achieving payment security is the use of tokens, provided via the Visa Token Service (VTS). Instead of storing sensitive payment credentials, devices store tokens with which they perform payments on the basis of the Europay Mastercard Visa (EMV) protocol. If a mobile communication device is compromised, the adversary only retrieves the token and not the payment credentials. Because the tokens are bound to mobile communication devices, the adversary's ability to use the token for payments will be limited, and a new token can be issued without requiring new payment credentials to be generated.

Nevertheless, mobile communication devices are prone to compromise by malware with the ability to covertly steal tokens. Current mobile communication devices have limited ability to protect the tokens.

Aspects of the present invention address these and other problems individually and collectively.

BRIEF SUMMARY

Aspects of the invention are directed to performing mobile payments using multiple cryptographic protocols One embodiment of the invention is directed to a method for enabling mobile payment transactions using multiple cryptographic protocols. An example method includes generating, by a mobile communication device, a first cryptogram using a first identifier and a first cryptographic key, stored in a memory of the mobile communication device. The mobile communication device generates within a key store of the mobile communication device, a second cryptogram using a second identifier and a second cryptographic key that is stored in the key store. The method further includes combining, by the mobile communication device, the first cryptogram and a number of characters of the second cryptogram equal to a length of the first cryptogram to generate a third cryptogram. The mobile communication device ten transmits the third cryptogram in an authorization request message to a payment processing computer.

Additional aspects are directed to a mobile communication device comprising a processor, and a computer readable medium. The computer readable medium comprises code, executable by the processor, configured or programmed to perform the above-noted method.

Further details regarding aspects of the invention can be found in the Detailed Description and the Figures.

Figure 1:
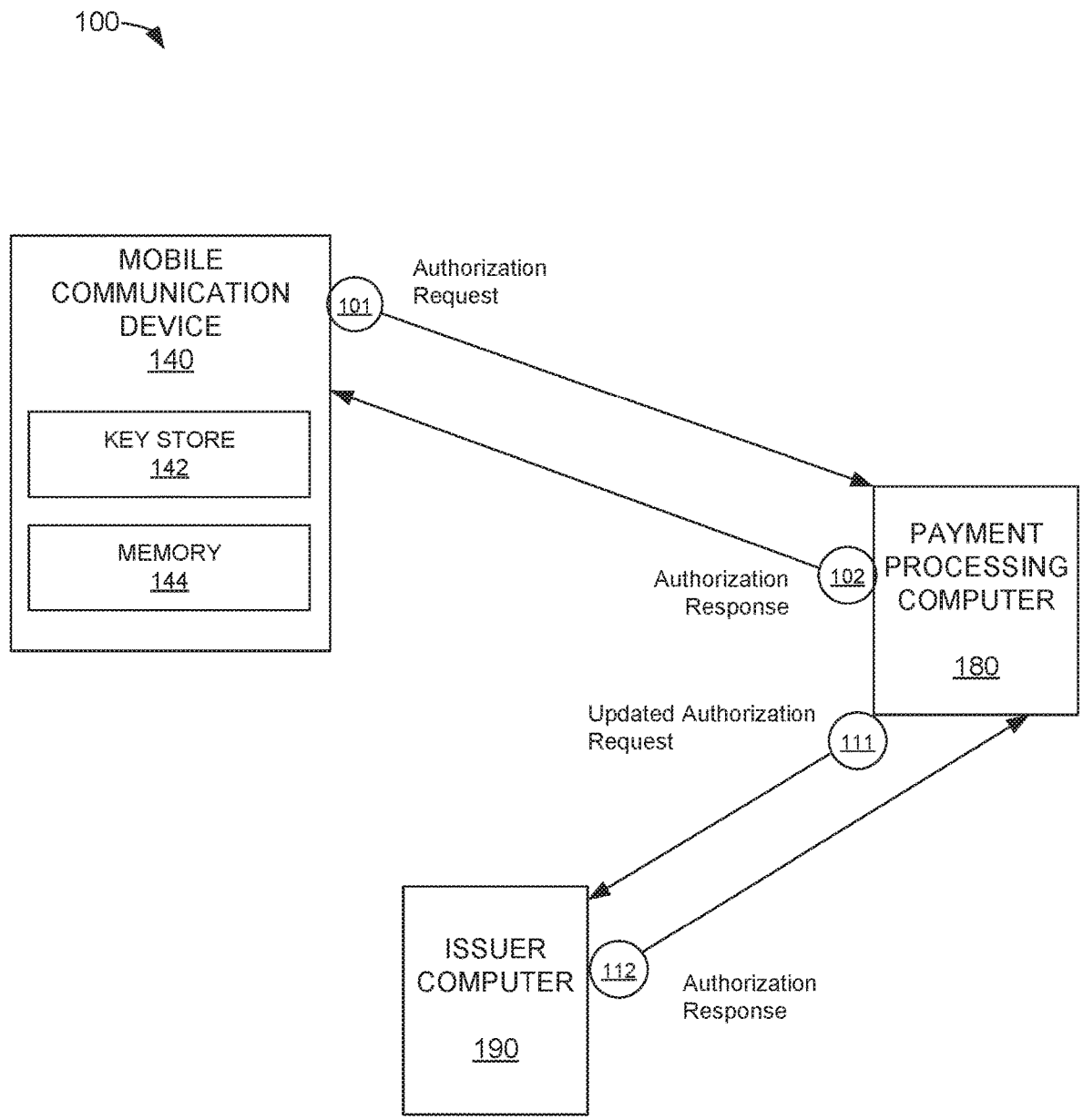
FIG. 1 shows a system diagram illustrating secure mobile payment communications using multiple cryptographic protocols in accordance with some aspects.

In the drawings, dotted or dashed lines may be used to indicate organizational structure, to indicate that an element is optional, or to indicate that data or information is passed through an element substantially unchanged. Arrows may be used to indicate the flow of data or information between two or more elements. Circles having reference numbers may indicate that certain steps are performed by an adjacent element.

TERMS

Prior to discussing aspects of the invention, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (3DES), data encryption standard (DES), advanced encryption standard (AES), etc.

A "key store" is a hardware-implemented repository for security certificates and cryptographic keys. Certificates and keys may be manipulated within the key stores without extracting the private data associated therewith.

The term "authentication data" or "authentication information" may include any data or information suitable to authenticate a user or device. Examples of authentication data may include a password or passphrase, a secret key (e.g., a private key), a digital signature, an indication that the device is storing certain information, etc.

A "payment processor" may be an entity that authenticates a payment authorization request. Examples of an authorizing entity may be an issuer, a governmental agency, a document repository, an access administrator, etc. An authorizing entity may operate an authorizing entity computer.

An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "mobile communication device" may comprise any electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "user" may include an individual. In some aspects, a user may be associated with one or more personal accounts and/or user devices.

A "cryptographic protocol" may include a protocol that performs a security-related function and applies cryptographic methods. The protocol describes how the cryptographic algorithms should be used to secure information. Cryptographic protocols applied to mobile payments may be employed with the various aspects of the present disclosure. Such cryptographic protocols can include AES, DES, 3-DES, and the like.

An "identifier" may include a primary account number (PAN) and/or an expiration date. In some aspects, an identifier may be "format preserving" and may have a numeric format such as that used in existing transaction processing networks (e.g., ISO 8583 financial transaction message format). Non-limiting examples include credit card numbers, bank account numbers, a member number or customer number linked to available resources.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some aspects, a token may be "format preserving" and may have a numeric format that conforms to the account identifiers used in existing transaction processing networks (e.g., ISO 8583 financial transaction message format). In some aspects, a token may be used in place of a PAN to initiate, authorize, settle or resolve a payment transaction or represent the original credential in other systems where the original credential would typically be provided. In some aspects, a token value may be generated such that the recovery of the original PAN or other account identifier from the token value may not be computationally derived. Further, in some aspects, the token format may be configured to allow the entity receiving the token to identify it as a token and recognize the entity that issued the token.

An "authorization request message" may be a message that requests permission to conduct an interaction. For example, an authorization request message may include an electronic message that is sent to a payment processing network and/or an issuer of a payment card to request authorization for a transaction. An authorization request message according to some aspects may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some aspects, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some aspects, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "cryptogram" may be an obscured or encoded representation of text. For example a cryptogram may be an obscured or encrypted text string repeating or generated by a cryptographic key.

An "AES key" is a cryptographic key generated using the advanced encryption standard (AES), also known as Rijndael. It is a symmetric key algorithm used in many payment systems.

A "triple-DES key" is a cryptographic key generated using the triple data encryption standard (3DES) is also known as the triple data encryption algorithm (TDEA). This algorithm is a symmetric key cipher that includes the application of the DES cipher three times to each block of data.

DETAILED DESCRIPTION

Systems and methods enable secure transactions between computing devices using multiple cryptographic protocols to obscure payment tokens. Payment tokens or account numbers stored on mobile communication devices may be susceptible to theft or compromise. This susceptibility is increased when payment tokens are stored in an unsecured memory, which may be accessible by subversive applications loaded on the mobile communication device or malicious actors that have compromised the mobile communication device. To prevent malicious actors from using the payment tokens, a cryptographic key can be used to generate a cryptogram (e.g., a signature) of the payment token, thereby encrypting it. A transaction may proceed if the cryptogram can be verified/authenticated. Nevertheless, mobile communication devices are prone to compromise by malware with the ability to covertly steal tokens, leaving an attack vector for adversaries. To limit the capabilities of such malware, devices allow applications to store cryptographic keys in so-called key stores, which provide additional protections against malware. Applications can then cryptographically protect their data using the keys from the device's key store. Ideally, such key stores should be used to store the cryptographic keys used for cryptogram generation for token-based EMV payments, which use DES cryptography.

Many mobile communication devices do not support key stores with DES cryptographic keys. This lack of capability is problematic due to the large number of payment applications that require DES cryptographic keys for backward compatibility. To store these keys, mobile communication devices use memory locations to store DES based cryptographic keys, e.g., using standard memory accessible by software. This makes these keys susceptible to theft or compromise, which is highly problematic because the keys associated with payment applications might be considered to be some of the most sensitive keys on the mobile communication device. A straightforward solution would be to require participants in the payments ecosystem to use AES-based cryptograms, however the resulting deployment cost in money and time resources is prohibitive. To address this problem, some embodiments of the present disclosure can provide solutions that use device key stores to improve payments security on the devices despite the fact that they cannot store DES keys, and introduces little to no change to other participants in the payments ecosystem, other than a payment processor.

Systems and methods can use multiple cryptographic protocols to protect payment tokens during a transaction. These systems and methods can modify one cryptogram created using a key of a cryptographic protocol supported by a key store, such as AES, to conform to requirements for another cryptogram required by an issuer, such as DES. This other cryptogram may be of another cryptographic protocol that is not supported by the key store. The systems and methods thus enable use of the modified cryptogram in payment transactions requiring cryptograms to be in the format of the other cryptographic protocol. Cryptographic keys that can be stored in a mobile communication device key store can be protected when not in use and used in conjunction with cryptographic keys in secure memory to carry out secure transactions regardless of the integrity of the cryptographic keys stored in secure memory.

As an example, a personal account number (PAN), credit card number, or other identifier can be used by the mobile communication device to generate a first cryptogram (e.g., a signature). The first cryptogram can be generated using a first cryptographic protocol, such as 3-DES, which is not supported by many key stores. This first cryptogram can be generated in e memory of the mobile communication device. A second cryptogram can be generated using the same identifier as input to a second cryptographic protocol that is supported by a key store. Because the second cryptographic protocol is supported by the key store, the second cryptogram can be created within the key store, using a cryptographic key stored therein. The same PAN or a different PAN can be used to generate the second cryptogram.

In some examples, the second cryptogram can have its bit length altered to match the bit length of the first cryptogram. This may include truncation of the bits of the second cryptogram extending beyond the bit length of the first cryptogram. Truncation of the second cryptogram may be implemented according to the EMV standard. The difference in bits between the bit length of the first and second cryptograms can be simply removed from the end, beginning, or middle of the second cryptogram. Additionally, bits may be removed according to a pattern, such as every other bit is removed from the second cryptogram. The modified second cryptogram and the first cryptogram are then combined via an operation, such as an exclusive or (XOR) to produce a third cryptogram. This third cryptogram can be transmitted to a payment processing computer in an authorization request message and used to complete the transaction authorization.

A payment processing computer receiving the authorization request message can reverse the operation or otherwise extract the bits of the second cryptogram from the third cryptogram, leaving behind the first cryptogram. Because the first cryptogram was generated or signed using a cryptographic key of a protocol required by the issuer computer, the first cryptogram would be in a format identifiable by the issuer computer, and can be used to authorize a transaction, once received from the payment processing network.

In another example, the payment processing computer can receive the third cryptogram and attempt to recreate it. The payment processing computer can have access to the identifier(s) of the user initiating the transaction (e.g., PAN, an account of CVV number, etc.) to generate a first test cryptogram using the first cryptographic protocol and to generate a second test cryptogram using the second cryptographic protocol. The payment processing computer can combine the first test cryptogram and the second test cryptogram with the same operation as was used to generate the third cryptogram. This third test cryptogram can be compared against the third cryptogram received in the authorization request message. If the two match, then the payment processing computer can determine the user's identity authenticated and pass a PAN (or other data, such as one of the generated cryptograms) to the issuer computer for transaction authorization.

Accordingly, various aspects disclosed herein provide solutions for utilizing both DES and AES keys in authorizing financial transactions in a manner that protects the security of keys stored on a mobile communication device. These solutions may enable the use of device key stores to improve payments security on the devices even though current key stores cannot hold DES keys. The solutions may be implemented with little to no change to participants in the payments ecosystem, other than a payment processor.

I. Use of Multiple Cryptographic Protocols in Payment Processing Networks

Payment processing networks typically use DES signed cryptograms during user authentication as part of a payment authorization process. Mobile communication devices store DES keys and use keys to generate cryptograms having a bit length accepted by the payment processing network. The cryptogram is transmitted to an authenticator, which can operate a payment processing computer to receive and authenticate user payment requests. Authenticated requests are processed by an issuer and a response returned though the payment processing computer. A benefit of the disclosed aspects is that the established payment processing network infrastructure and general process can be maintained while still providing improved data security. An example of a payment processing network suitable for implementing the various aspects is described with reference to FIG. 1.

FIG. 1 shows a simplified system diagram 100 illustrating secure mobile payment communications using multiple cryptographic protocols, in accordance with some aspects. The system diagram 100 may be used between any mobile communication device and any second computer. The client/server distinction used herein is merely exemplary and made to improve readability. In some aspects, the mobile communication device 140 may perform the operations described as being performed by the payment processing computer 180. In some aspects, the payment processing computer 180 may perform the operations described as being performed by the mobile communication device 140.

Referring to FIG. 1, the mobile communication device 140 may have the capability to store cryptographic keys and use these keys to generate cryptograms for use in mobile payment transactions. Cryptographic keys can be stored in a key store 142 and/or memory 144 depending on the cryptographic protocol associated with the cryptographic key. As an example, a DES key can be stored in memory 144, and an AES key can be stored in key store 142.

A first cryptographic key stored in the memory 144 can be used according to the first cryptographic protocol to generate a first cryptogram having a first bit length. A second cryptographic key associated with a different cryptographic protocol than the first cryptographic key, can be stored in the key store 142 and used to generate a second cryptogram within the key store, thereby reducing the risk of key exposure during the cryptogram generation process. In some mobile communication devices, the key store 142 is a hardware-based secured location in memory and may only be compatible with certain cryptographic protocols such as AES. Any cryptographic keys that are associated with cryptographic protocols that are unsupported by the key store 142 can be stored in the memory 144, which may be unsecured.

The mobile communication device 140 and the payment processing computer 180 may communicate over an unsecured network (e.g., the internet or a wireless local area network). The unsecured network may be "unsecured" in that the communication medium itself is not physically secured or it may be "unsecured" in that communications do not travel directed between two parties but also through other third parties in the network.

The mobile communication device 140 and the payment processing computer 180 may exchange cryptographic data over the unsecured network as part of a mobile payment transaction. For example, the mobile communication device 140 may generate a cryptogram using multiple cryptographic protocols and keys as part of an authorization request message and share this data with the payment processing computer 180. The payment processing computer 180 may each derive its own version of the cryptogram in order to authenticate the mobile communication device 140 as approved to make a requested transaction.

Various aspects may combine a DES-based cryptogram such as a 3DES cryptogram with an AES-based cryptogram to provide a means for increasing security and cross-compatibility in mobile payment transactions. An original 3DES-based key distributed for use in mobile payments. These keys may be stored in the memory 144 of the mobile communication device 140 because the key store 142 of most mobile communication devices does not support 3DES cryptographic keys. A second, AES-based key can be loaded into the key store 142 of the mobile communication device 140 and used only within the key store 142. By enabling use of the AES-based key only within the key store 142, the various aspects reduce the likelihood that the AES-based key will be exposed to malicious actors.

An AES-based cryptogram may be calculated using calls to the key store 142 to encrypt an identifier, which may be the same or different from the identifier used to generate the first cryptogram. Once the mobile communication device 140 has calculated both a 3DES-based cryptogram $AC_{DES}$ and the AES-based cryptogram $AC_{AES}$, the mobile communication device 140 may combine the two cryptograms. For example the mobile communication device 140 may execute an XOR operation to combine the two cryptograms together. Thus the first cryptogram (e.g., a 3DES-based cryptogram) and a second cryptogram (e.g., an AES-based cryptogram) may be combined to form a third cryptogram. Because the AES-based cryptogram was generated within the key store 142, the resulting third cryptogram is secure from malicious actors even if the 3DES cryptographic key has been compromised.

Because the AES-based cryptogram and the 3DES-based cryptogram may have differing bit lengths, the mobile communication device 140 may modify the character string of the AES-based cryptogram to reduce the number of characters to a length equal to that of the 3DES-based cryptogram. For example, the processor of the mobile communication device 140 may truncate the AES-based cryptogram, remove characters from the string according to a pattern, or otherwise remove characters from the AES-based cryptogram in a repeatable and previously defined manner in order to achieve a string of equal size to the 3DES-based cryptogram.

The third cryptogram may be sent inside a payment transaction, e.g., an authorization request message 101 to the payment processing computer 180 for processing. Because the length of the third cryptogram is consistent with 3DES-based cryptograms there will be no need to change the communication format adopted by Visa for mobile payment authorization request messages. Thus, current payment processing network infrastructure can be maintained while implementing the improved security of the multiple cryptographic protocols.

Payment processing computer 180 can authenticate/verify the third cryptogram, and convert it to a suitable format for issuer computer 190, or otherwise generate a compatible authorization request message 101 for issuer computer 190. Such a compatible message can include the first cryptogram, e.g., as generated using 3DES. In another example, Payment processing computer can use the account identifier (e.g., a token) to identify the actual account number used by the issuer (e.g., a PAN), and send the PAN in authorization request message 101. In various aspects, the authentication of the transaction associated with the third cryptogram may be performed in various ways.

In a first aspect, the payment processing computer 180 may receive the authorization request message. The payment processing computer 180 may then generate its own version of the first and second cryptograms using one or more identifiers. For example, the payment processing computer 180 may generate a first test cryptogram such as a 3DES-based cryptogram using a first cryptographic key applied to the identifier. The first test cryptogram should match that stored in the memory 144 of the mobile communication device 140. The payment processing computer 180 may generate a second test cryptogram, such as an AES-based cryptogram using an identifier and a cryptographic key that should match one stored in the key store 142 of the mobile communication device 140. The payment processing computer 180 may then combine the first test cryptogram and the second test cryptogram to obtain the third test cryptogram. As with the original combination, an XOR operation may be used to combine the first and second test cryptogram. The third test cryptogram may be compared to the contents of the authorization request message to determine if the third test cryptogram matches the third cryptogram. If the two match, then the payment processing computer 180 may transmit an authorization approval in an authorization response message 102 to the mobile communication device 140.

In another aspects, the payment processing computer 180 may receive the authorization request message 101 containing the third cryptogram. The payment processing computer 180 may use a computing device to generate a second test cryptogram (e.g., AES-based cryptogram) and may combine this second test cryptogram with the third cryptogram received in the authorization request message 101. The combination may be an XOR operation. The result of combining the second test cryptogram with the received third cryptogram may be to remove the AES-based cryptogram from the third cryptogram or otherwise undo the original combination of the first cryptogram and the second cryptogram. Thus, the result of the combination of the third cryptogram and the second test cryptogram may be the first cryptogram, i.e., the 3DES-based cryptogram. The payment processing computer 180 may update the authorization request message to include the first cryptogram rather than the third cryptogram. This updated authorization request message 111 may be transmitted to an issuer computer 190.

The issuer computer 190 may receive the updated authorization request message 111 including the first cryptogram. The issuer computer 190 may compare the first cryptogram with a known credential stored in a computing device of the issuer computer 190. The known credential may be a token, a cryptogram, or other obscured data associated with the 3DES key stored in the memory 144 of the mobile communication device 140. If the first cryptogram matches the known credential, then the issuer computer 190 may transmit an authorization approval to the payment processing computer 180, which forwards the authorization response message 112 to the mobile communication device 140 in as authorization response message 102.

In both aspects, security of the DES-based key is maintained because no key or single cryptogram is transmitted. In the event that the 3DES key is compromised by a malicious actor, the AES key remains safe in the key store 142 and is not used outside of that secure structure. Thus a malicious actor should not be able to create a valid 'XORed' cryptogram that would enable the actor to man-in-the middle the payment transaction.

II. Implementations of Mobile Payments Using Multiple Cryptographic Protocols

Although the overall infrastructure and message flow of current payment processing networks can be easily adapted to support the various methods, there may be multiple approaches for authenticating and authorizing a payment transaction including the third cryptogram. In some examples, the payment processing computer can authenticate and authorize the transaction using its own stored credentials for a user. In other examples, the payment processing computer can authenticate the user and then send a 3DES cryptogram to an issuer for authorization. Implementation of an example method may depend on the structure of the payment processing network implementing the various aspects. These example methods are described in greater detail with reference to FIGS. 2-3.

Figure 2:
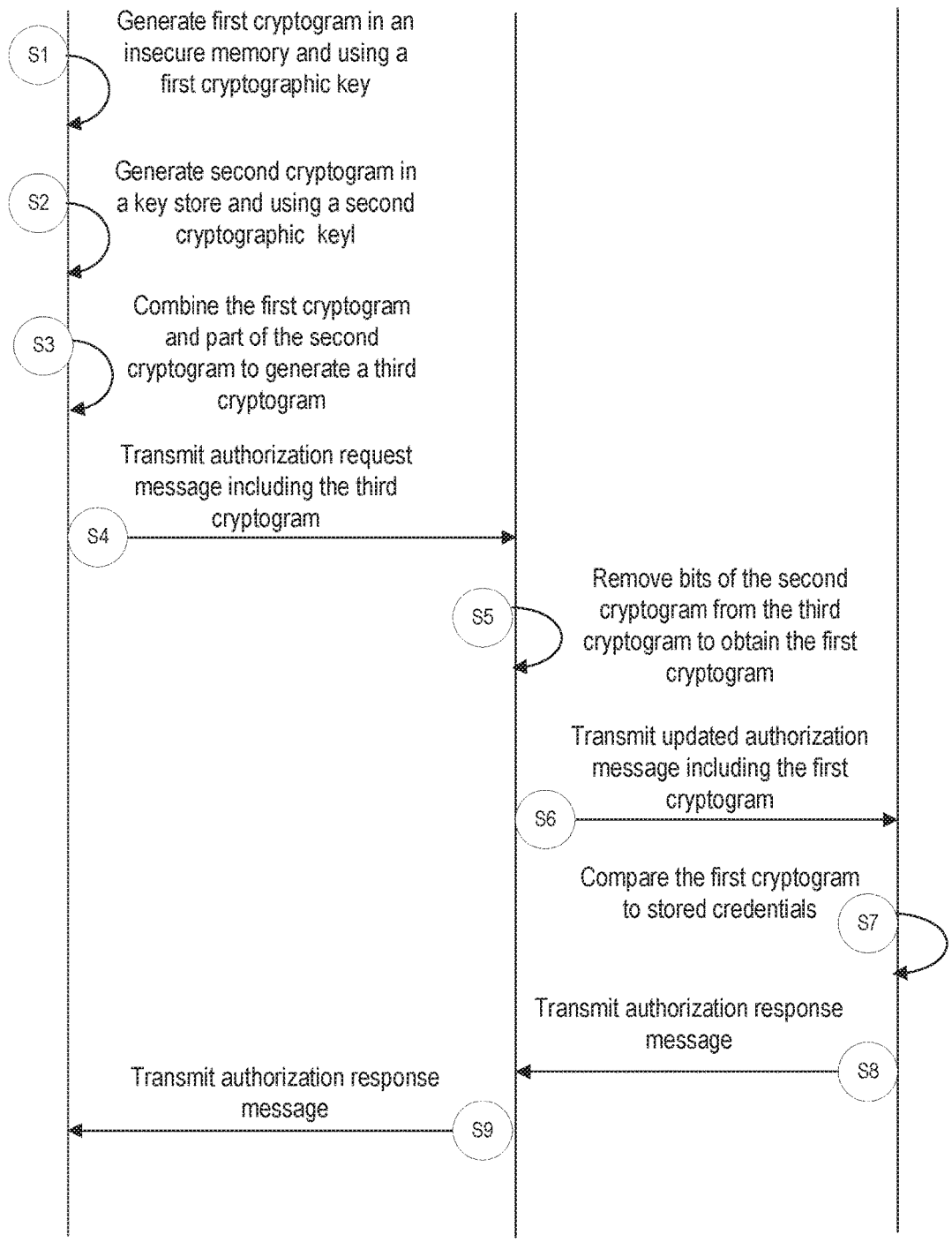
FIG. 2 shows a message flow diagram of a method for performing an authorization of a mobile payment involving multiple cryptographic protocols, in accordance with some aspects.

A. Methods Including Authentication by the Processing Computer and Authorization by the Issuer Computer FIG. 2 shows a message flow of a method 200 for performing, by a mobile communication device and payment processing network, a mobile payment transaction using multiple cryptographic protocols, in accordance with some aspects. The method 200 includes generation of a cryptogram by the mobile communication device 140, authentication by the payment processing computer 180, and authorization by an issuer computer 190.

At step S1, the mobile communication device 140 generates a first cryptogram using a first cryptographic key stored in unsecured memory (e.g., memory 142). The first cryptographic key is associated with the first cryptographic protocol, such as 3DES. The cryptogram can be a cryptographic signature of a PAN including credit card numbers, account numbers, CVV, or other personally identifying account information. The generation of the first cryptogram can be completed in secure memory, which may or may not be exposed to applications loaded on the mobile communication device 140.

At step S2, the mobile communication device 140 generates a second cryptogram using a second cryptographic key. The second cryptographic key may be associated with a cryptographic protocol that is compatible with the key store (e.g., key store 142) enabling the second cryptographic key to be stored in the key store. A processor of the mobile communication device 140 can send a call to the key store application to execute cryptogram generation operations. The second cryptographic key is used to cryptographically sign a PAN that may be the same or different from the PAN used to generate the first cryptogram.

At step S3, the mobile communication device 140 combines the first cryptogram with the second cryptogram to generate the third cryptogram. Because the two cryptograms may have differing lengths, the length of the character string of the second cryptogram may need to be modified to match the length of the first cryptogram before the combination operation can be performed. The length of the second cryptogram can be adjusted by removing a determined number of characters or bits from the beginning, end, or any interim portion of the second cryptogram. Similarly, characters can be removed from the second cryptogram according to a pattern, such as every other or every second character being removed. Once the length of the first cryptogram and the second cryptogram match, the combination operation is performed.

The combination of the two cryptograms will generally take place outside of the key store, except in the case in which both the first cryptographic key and the second cryptographic key are compatible with the key store and stored therein. The result of the combination of the first cryptogram and the second cryptogram using the logical operator is a third cryptogram. The combination may be a reversible logical operation such as an XOR or other reversible commutative logical operation. For example, characters or bits of the two cryptograms can be interleaved according a pattern. So long as the logical operation has the property of being reversible if provided the third cryptogram and at least one of the first cryptogram or the second cryptogram, then the logical operation can be used to combine the two cryptograms. The payment processing computer 180 will be aware of the logical operator in use for combining the first and second cryptogram.

At step S4, the mobile communication device 140 transmits an authorization request message including the third cryptogram. The authorization request message is generated by the mobile communication device 140 as part of commencing a mobile payment transaction. In addition to the third cryptogram, the authorization request message can contain information about the transaction amount, the resource provider or merchant, an issuer, and/or any additional information needed to authorize the transaction. The mobile communication device 140 generates this authorization request and sends it to a payment processing network for authentication and authorization.

In step S5, the payment processing computer 180 can obtain the first cryptogram by removing the bits of the second cryptogram from the third cryptogram. In the aspects described in FIG. 2, the payment processing computer 180 has access to the second cryptogram, or the ability to recreate the second cryptogram (e.g., by applying a known cryptographic key to the PAN). The second cryptogram may be previously provided to the payment processing computer 180 by the mobile communication device 140 as part of an account registration process. Alternatively, the payment processing computer may independently calculated the second cryptogram using a PAN known to the payment processing network and a cryptographic key assigned to the user. The second cryptogram can be stored in a database or other storage associated with the payment processing computer 180. The payment processing computer 180 applies the second cryptogram to the third cryptogram received in the authorization request message, thereby reversing the logical operation performed in step S3. The result of combining the second cryptogram and the received third cryptogram via the logical operation is the first cryptogram.

At step S6, the payment processing computer 180 transmits an updated authorization request message containing the first cryptogram, to the issuer computer 190. For example, the payment processing computer 180 can replace the third cryptogram in the received authorization request message with the first cryptogram obtained during S5. An updated authorization message thus contains the first cryptogram rather than the third cryptogram originally provided by the mobile communication device 140. This updated authorization request message is transmitted to the issuer computer 190 for final authorization of denial of the transaction.

At step S7, the issuer computer 190 compares the first cryptogram, received in the updated authorization request message to a stored credential to determine a PAN of the user. Credentials for users holding accounts with an issuer entity can be stored on the issuer computer 190 and accessed during authorization of transactions. Information provided in the updated authorization request message including identifying information of the user or the account, can enable the issuer computer 190 to look up the relevant credentials in the user credential database. Once a relevant credential is obtained it can be c compared to the first cryptogram. Credentials can include portions of the first cryptogram, the first cryptogram in full, and/or the first cryptographic key. If the credential is the first cryptographic key, then the issuer computer 190 can decrypt the first cryptogram and compare the resulting PAN against a stored PAN for the user. If the credential is part of the first cryptogram, then the issuer computer 190 can look up the user's PAN after identifying a match between the credential and the first cryptogram. The PAN is then used to approve or deny the submitted transaction.

At step 8, the issuer computer 190 transmits an authorization response message. In some aspects, the authorization response message is transmitted to the payment processing computer 180, which forwards the message to the mobile communication device 140 in step S9. In other aspects, the issuer computer 190 can transmit the authorization response message directly to the mobile communication device.

B. Methods Including Authentication by the Processing Computer

Figure 3:
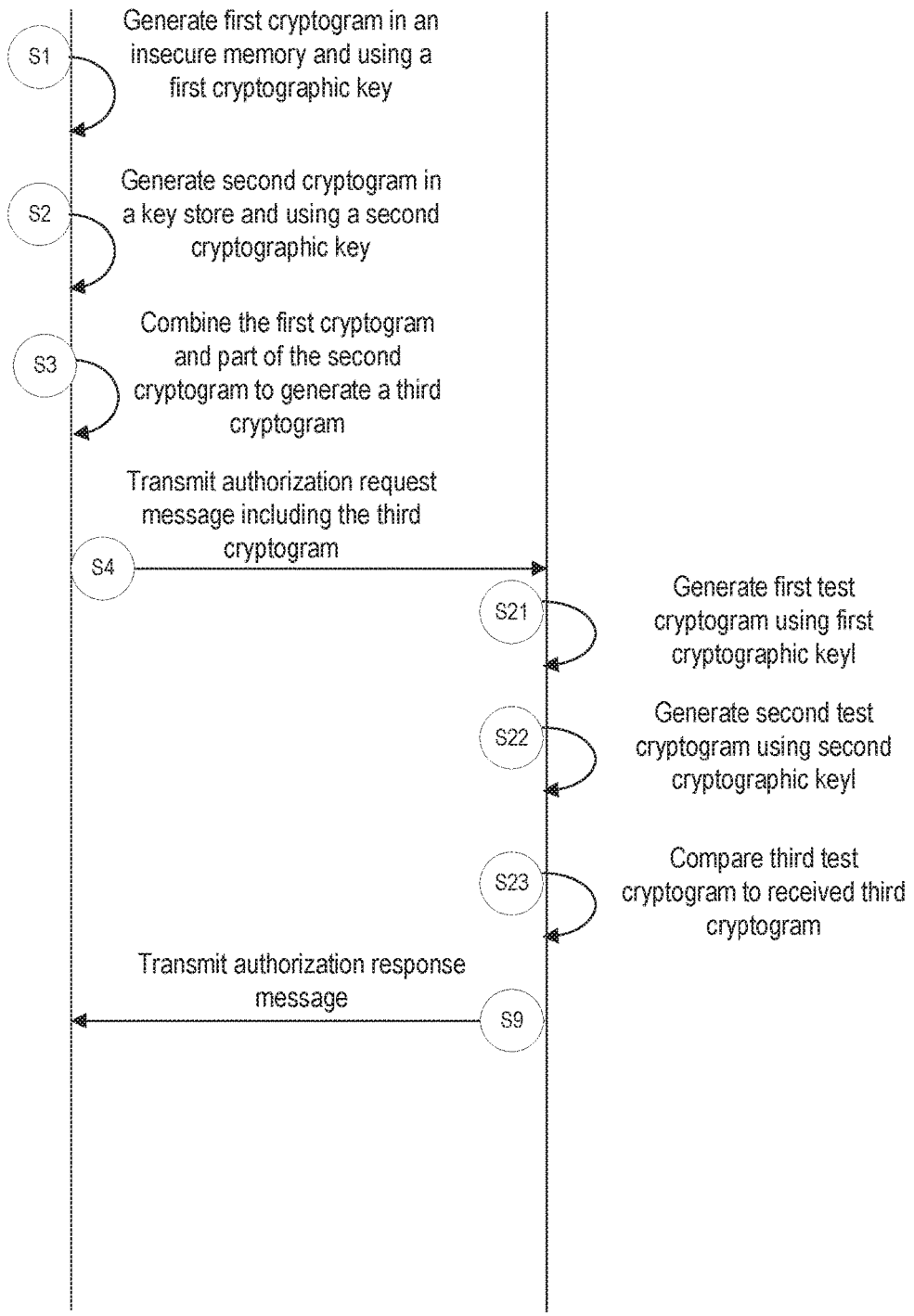
FIG. 3 shows a message flow diagram of another method for performing an authorization of a mobile payment involving multiple cryptographic protocols, in accordance with some aspects.

FIG. 3 shows a message flow of another method 300 for performing, by a mobile communication device and payment processing network, a mobile payment transaction using multiple cryptographic protocols, in accordance with some aspects. The method 300 includes generation of a cryptogram by the mobile communication device 140 with authentication and authorization by the payment processing computer 180. Steps S1-S4 of method 300 proceed in the same manner as described with reference to FIG. 2.

At step S21, the payment processing computer 180 can generate a first test cryptogram using the first cryptographic protocol. For example, the payment processing computer 180 can use a stored copy of the first cryptographic key of the mobile communication device 140 and one or more PANs to generate the first test cryptogram. In some aspects, the PAN to be used may be predetermined. In other aspects, the PAN is in some way identified in the authorization request message, informing the payment processing computer 180 which PAN should be used to generate the first test cryptogram. For example an issuer id contained in the authorization request message can enable the payment processing computer to identify an associated account and PAN of a user. The payment processing computer can store a database of user cryptographic keys and PANS for to facilitate cryptogram generation. This database can be similar to or in lieu of the issuer computer database in FIG. 2.

At step S22, the payment processing computer 180 generates a second test cryptogram using the second cryptographic protocol. The second test cryptogram is generated by using the second cryptographic key of the user to the second PAN. As with the first cryptographic key, the payment processing computer 180 can maintain a copy of the second cryptographic key and the second PAN of ruse in generating the second test cryptogram.

At step S23, the payment processing computer can generate a third test cryptogram by combining the first test cryptogram and the second test cryptogram using the logical operation. The resulting third test cryptogram is compared against the third cryptogram received in the authorization request message to determine if a match exists. If the third cryptogram is successfully recreated, then the payment processing computer 180 considers the transaction authenticated. In some aspects, the payment processing computer 180 can approves the authorization request without involving the issuer and transmit an authorization response message at step S9. In other aspects, the payment processing computer 180 can proceed with steps S7 and S8 as described with reference to FIG. 2.

III. Devices for Implementing Mobile Payments Using Multiple Cryptographic Protocols Components of the payment processing network implementing the present methods are not restricted to a single network structure. The computing devices described with references to FIGS. 1-3 can be configured in a variety of ways. Mobile communication devices of different make and model can be used to implement the methods for mobile payment transactions. Mobile communication devices that support key stores are well-suited for use with the present methods. Similarly, the payment processing computer and issuer computer can be implemented using a variety of devices capable of data storage and network communications.

A. Example Mobile Communication Devices

Figure 4:
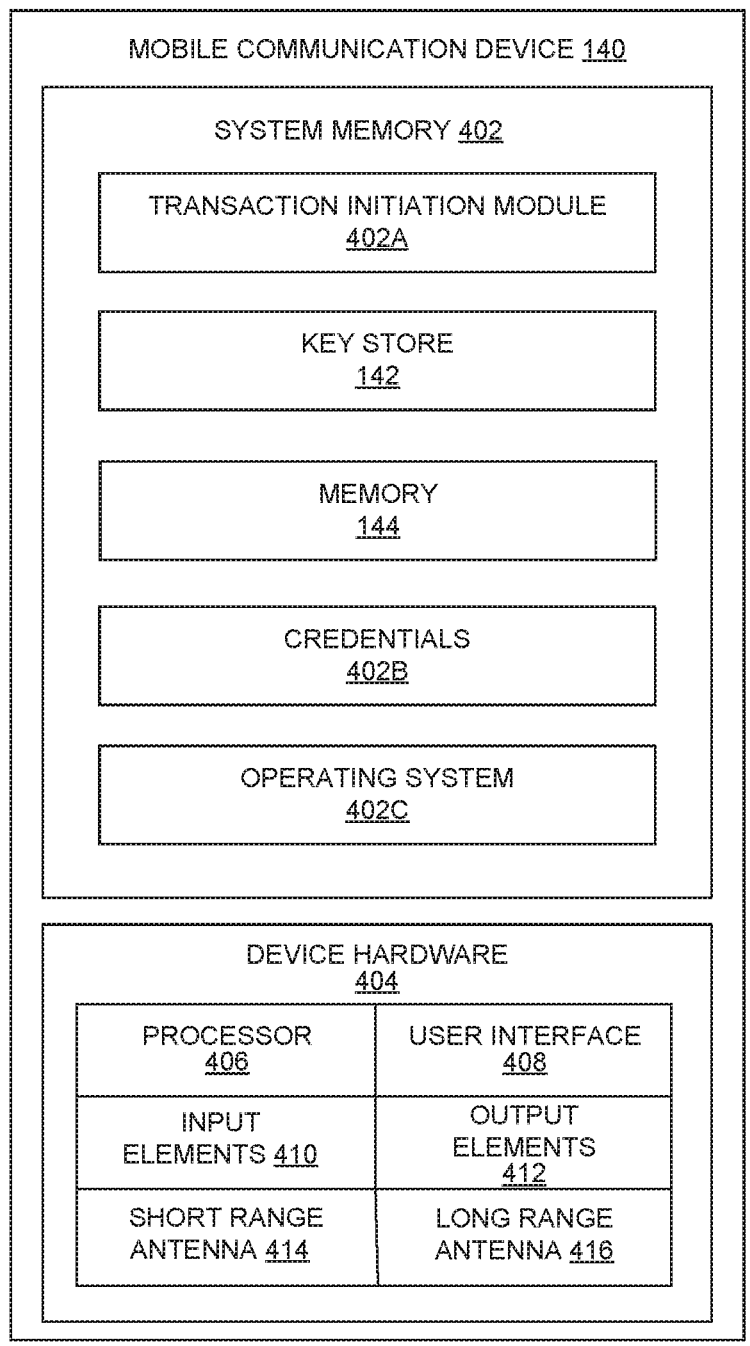
FIG. 4 shows a block diagram of a mobile communication device for performing a mobile transaction using multiple cryptographic protocols, in accordance with some aspects.

FIG. 4 illustrates a mobile communication device 140 for use in performing transactions using multiple cryptographic protocols. Mobile communication device 140 may include device hardware 404 coupled to a system memory 402.

Device hardware 404 may include a processor 405, a short range antenna 4209, a long range antenna 419, a biometric scanner 407, a user interface 408, input elements 410 (e.g., sensors, camera, key pad, touch screen), and output elements 412 (which may be part of the user interface 408). The processor 406 can be implemented as one or more integrated circuits (e.g., one or more single core or multicore microprocessors and/or microcontrollers), and is used to control the operation of mobile communication device 140. The processor 405 can execute a variety of programs in response to program code or computer-readable code stored in the system memory 402, and can maintain multiple concurrently executing programs or processes.

The long range antenna 419 may include one or more RF transceivers and/or connectors that can be used by mobile communication device 140 to communicate with other devices and/or to connect with external networks and devices such as the payment processing computer 180 and issuer computer 190. The user interface 408 can include any combination of input and output elements to allow a user to interact with and invoke the functionalities of mobile communication device 140. The user interface 408 can thus enable a user to input payment amounts, select cards or accounts for use in transactions, and initiate payments.

The system memory 402 can be implemented using any combination of any number of non-volatile memories (e.g., flash memory) and volatile memories (e.g. DRAM, SRAM), or any other non-transitory storage medium, or a combination thereof media. System memory 402 may store a mobile operating system 402C and a mobile application environment where one or more mobile applications reside (e.g. a payment application such as a mobile wallet application, merchant application, mobile location application, etc.) to be executed by the processor 405. Also, the system memory 402 may store computer code, executable by the processor 205, for performing any of the functions described herein.

The system memory 402 may also store a transaction initiation module 402A, the key store 142, memory 144, as well as credentials 402B, The transaction initiation module 822 may include instructions of code for receiving an input from a user such as via voice or touch screen, or as an API call to a payment application executing on the mobile communication device 140. The API call may indicate a selection for a transaction to begin and optionally authorization to take place. This can include storing and removing cryptographic keys from the key store 142, in addition to generating cryptograms using those cryptographic keys. Cryptographic keys that are not compatible with t the key store can be stored in unsecured memory 142. Credentials 402B including PANs, payment tokens, and other personal financial information can be used to generate cryptograms with one or more cryptographic keys.

B. Example Payment Processing Devices

Figure 5:
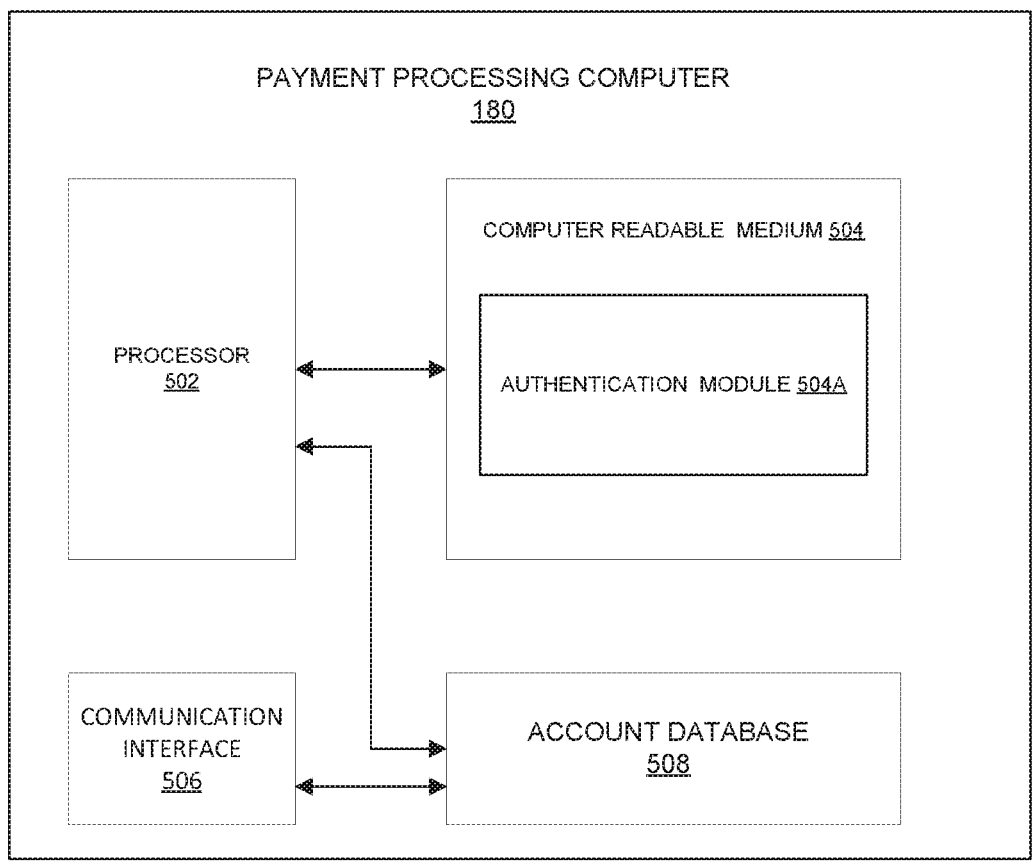
FIG. 5 shows a block diagram of n processor computer for use in performing mobile transactions, in accordance with some aspects.

FIG. 5 shows a block diagram illustrating some components in the payment processing computer 180. The payment processing computer 180 may have one or more processors 502, coupled to a computer readable medium 504, an account database 508, and communication interface 506.

The computer readable medium 504 may comprise an authentication module 504A. The authentication module 504A may comprise instructions for instructing the one or more processors 502 to receive an authorization request message or a value transfer and return an authorization response message indicating whether the request is authorized. The authentication module may generate one or more cryptograms or retrieve them from the account database 508. These cryptograms are compared against information in the received authorization request message. Cryptograms or account information generated by the authentication module 502A can be transmitted to an issuer computer 140 as an updated authorization request message. An authorization response message may be received from the issuer computer 190. The authorization response message may be transmitted along with a digital certificate of the payment processing or authenticating entity.

Authorization for the transfer of value may take place when a mobile communication device 140 is connected to a data network, such as via long-range antenna 216. Value elements may be loaded onto and stored on mobile communication device 140 during times of connectivity and then used to complete secure offline transactions when a data network is unavailable.

Figure 6:
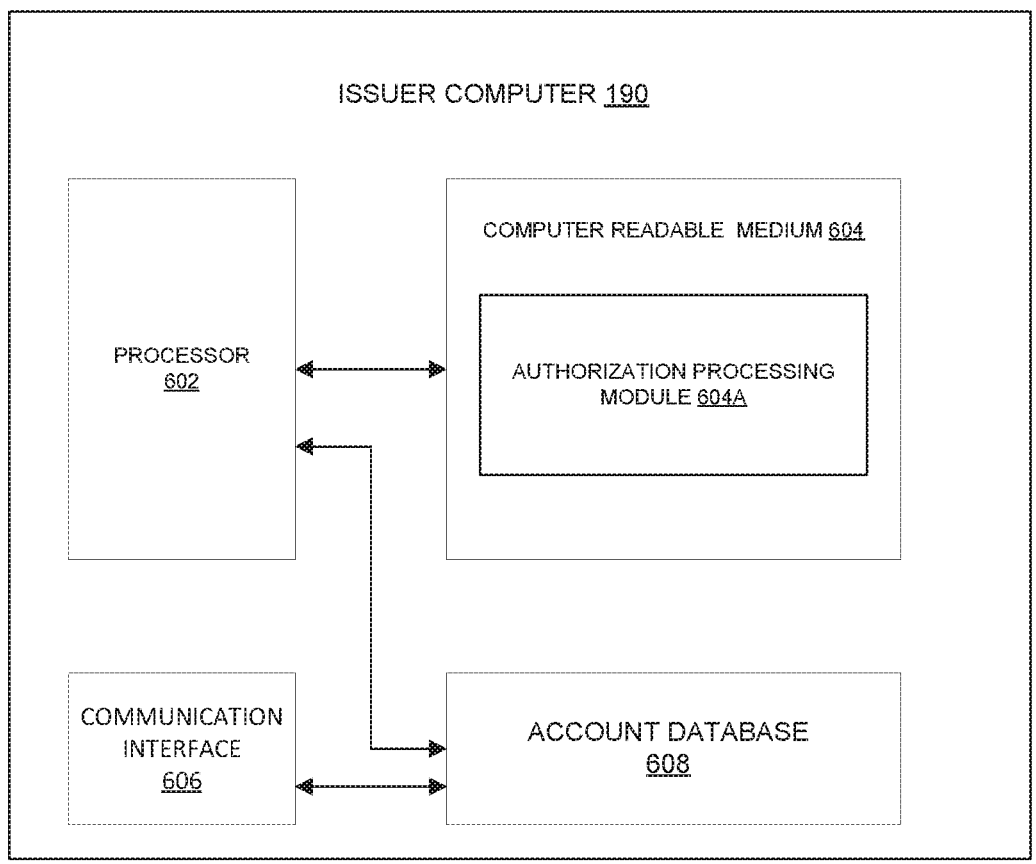
FIG. 6 shows a block diagram of an issuer computer for use in performing a mobile transaction, in accordance with some aspects.

FIG. 6 shows a block diagram illustrating some components in an issuer computer 190. The issuer computer 190 may have one or more processors 602, coupled to a computer readable medium 604, an account database 608, and communication interface 606.

The computer readable medium 604 may comprise an authorization processing module 604A. The authorization processing module 604A may comprise instructions for instructing the one or more processors 602 to receive an authorization request message or a value transfer and return an authorization response message indicating whether the request is authorized. The authorization processing module 604A may receive an authorization request message including a cryptogram or account identifier and may search the account database 608 for an associated account. If the account is found and contains sufficient funds to complete the request, the authorizing entity may authorize the transfer of assets from the account to a requesting mobile communication device 140.

In some aspects, the authorization request message is sent directly from the mobile communication device 140 to the issuer computer 190. In other aspects, the authorization request message may be sent to a payment processing computer 180 of a payment processing network such as Visa™. The payment processing computer 180 may forward the authorization request message to the issuer computer 190 and may take action based on the received authorization response message.

IV. Methods of Mobile Payments Using Multiple Cryptographic Protocols

Figure 7:
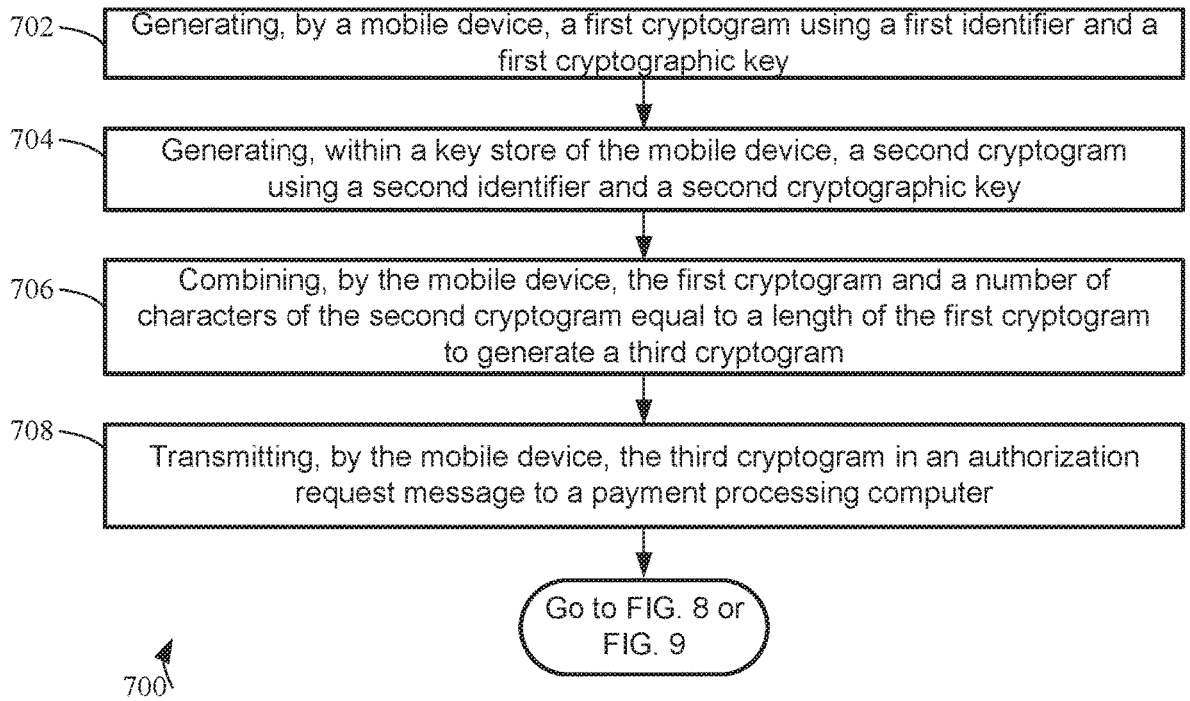
FIG. 7 shows a process flow diagram of a method for generating a payment authorization request message involving multiple cryptographic protocols, in accordance with some aspects.
Figure 8:
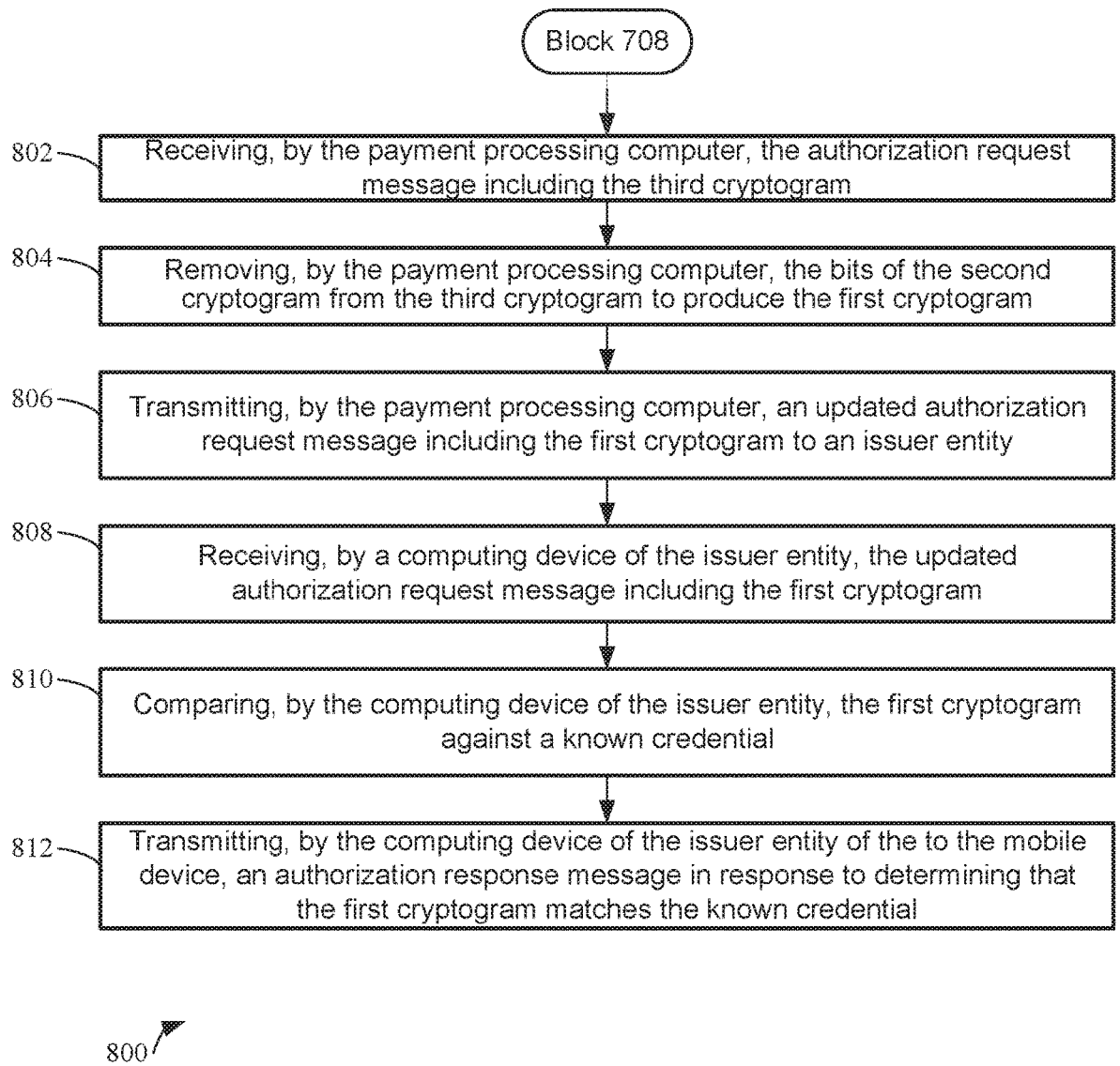
FIG. 8 shows a process flow diagram of a method for performing an authorization of a mobile payment involving multiple cryptographic protocols, in accordance with some aspects.
Figure 9:
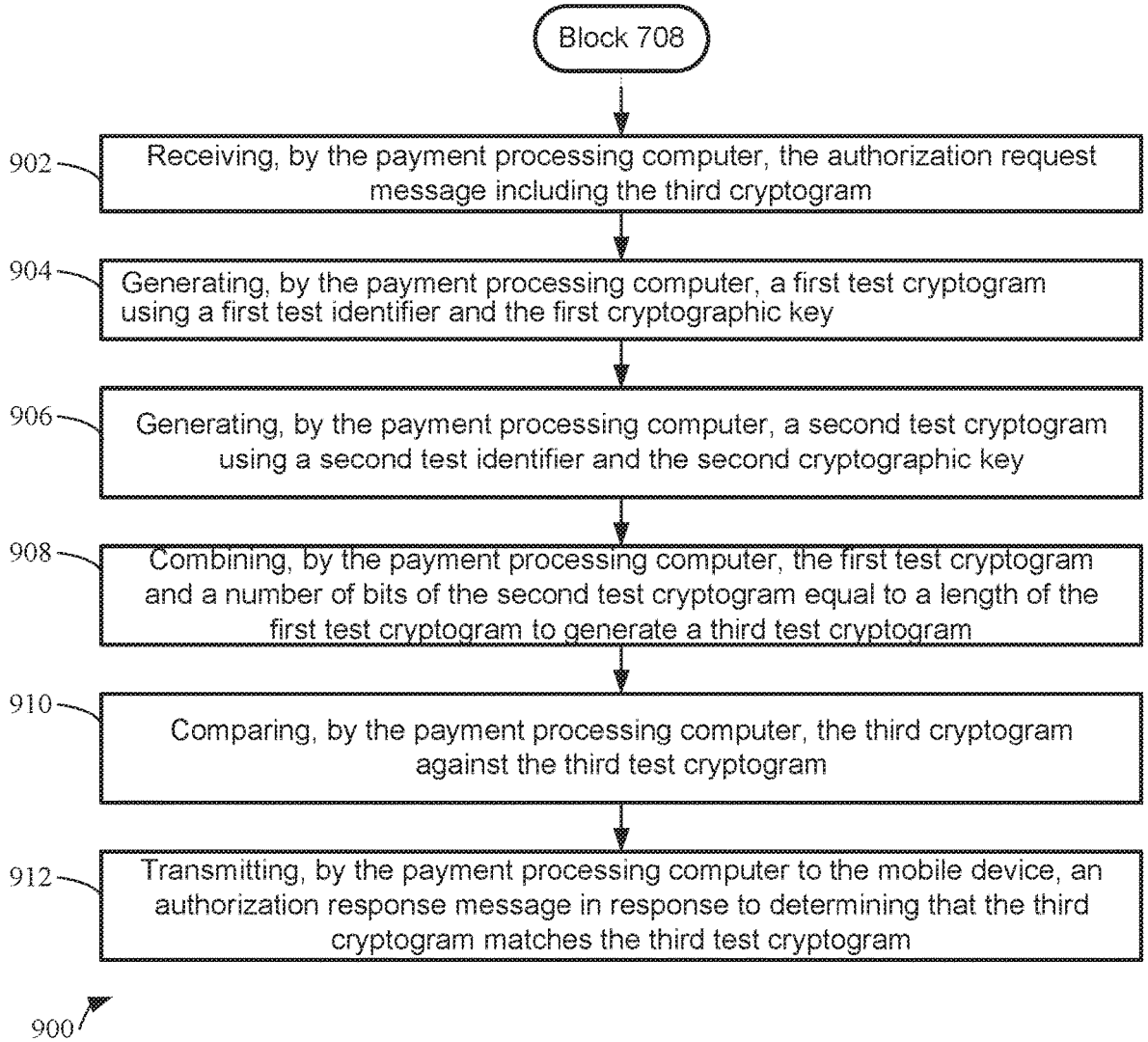
FIG. 9 shows a process flow diagram of another method for performing an authorization of a mobile payment involving multiple cryptographic protocols, in accordance with some aspects.

The methods described with reference to FIGS. 7-9 provide specific examples of implementation of authentication and authorization of mobile payment transactions using multiple cryptographic protocols. These examples are provided for illustrative purposes.

As part of the authentication of a payment authorization request, mobile communication device 140 generates an authorization request message to the payment processing computer 180. The contents of the authorization request message are used by the payment processing computer to authenticate the authorization request and ensure that it originated with the user account holder. To facilitate secure authentication, the authorization request message may include a cryptogram generated using an account identifier of the user.

FIG. 7 shows a flow chart of a method 700 for performing, by a mobile communication device, a mobile payment transaction using multiple cryptographic protocols, in accordance with some aspects. The multiple cryptographic protocols are used to generate cryptograms that can be combined via a reversible operation to obtain a single cryptogram. This resultant cryptogram is passed to a payment processing computer in an authorization request message, to enable the payment processing computer to authenticate the authorization request.

In block 702, the processor of the mobile communication device (e.g., mobile communication device 140) may generate, a first cryptogram using a first identifier and a first cryptographic key, stored in a memory of the mobile communication device. For example, the processor 406 can use the first cryptographic key stored in an unsecured memory, such as memory 144 may be used in accordance with the first cryptographic protocol to generate the first cryptogram. The first cryptographic protocol may be a DES based protocol, or other cryptographic protocol unsupported by key stores. The first cryptographic key is applied to the first identifier, which can be an account identifier, according to the first cryptographic protocol. The operations in block 702 can correspond to step S1 discussed with reference to FIGS. 2 and 3.

In block 704, the processor of the mobile communication device (e.g., mobile communication device 140) may generate, within a key store, a second cryptogram using a second identifier and a second cryptographic key, stored in the key store. In some aspects the second cryptographic key may be an AES key or a key associated with another cryptographic protocol compatible with storage in a key store such as key store 142. The second cryptogram can be generated in response to a payment authorization request, in which the processor 406 initiates a call to the key store 142 requesting that the second cryptogram be generated or retrieved if the second cryptogram has been previously stored. The operations in block 704 can correspond to step S2 discussed with reference to FIGS. 2 and 3.

In block 706, the processor of the mobile communication device (e.g., mobile communication device 140) may combine the first cryptogram and a number of characters of the second cryptogram equal to a length of the first cryptogram to generate a third cryptogram. For example, the processor 406 can determine the number of bits or characters in the first cryptogram and perform a reversible operation to combine the second and first cryptogram to obtain a third cryptogram that has the same number of bits or characters as the first cryptogram. This combination may include applying an exclusive or (XOR) function to the first cryptogram and the number of characters of the second cryptogram. The operations in block 706 can correspond to step S3 discussed with reference to FIGS. 2 and 3.

In block 708, the transceiver of the mobile communication device (e.g., mobile communication device 140) may transmit the third cryptogram in an authorization request message to the payment processing computer. For example, either of antennas 414 or 416 can be used to transmit data packets containing an authorization request message 101 with the generated third cryptogram. The authorization request message 101 cam be transmitted over a network such as the Internet or via direct communication between the payment processing computer 180 and the mobile communication device 140. The operations in block 708 can correspond to step S4 discussed with reference to FIGS. 2 and 3.

The authorization request message 101 may be authenticated in one of multiple ways. In a first example, the payment processing computer 180 can recreate the first cryptogram by reversing the operation performed by the mobile communication device to combine the first and second cryptogram. The payment processing computer 180 may have a stored copy of the second cryptogram or the ability to recreate the second cryptogram using a stored version of the second cryptographic key and a known account identifier of the user. Performing the reversible operation using the second cryptogram and the third cryptogram produces the first cryptogram, which is transmitted to the issuer computer 190 for authentication and approval of authorization of a mobile transaction.

FIG. 8 shows a flow chart of a method 800 for performing an authorization of a mobile payment transaction using multiple cryptographic protocols, by the payment processing computer and an issuer entity computer, in accordance with some aspects. The payment processing computer may obtain the first cryptogram using the reversible operation and a received third cryptogram. The first cryptogram, which is related to the DES or 3-DES cryptographic protocol may be used to authenticate the authorization request message and approve the payment transaction.

In block 802, the transceiver of the payment processing computer (e.g., payment processing computer 180) may receive the authorization request message including the third cryptogram. For example, the communication interface 506 of the payment processing computer 180 can receive data packets including the authorization request message 101 from the mobile communication device 140. The authorization request message 101 may contain information about the payment transaction such as the amount, recipient or merchant, and other information needed to process the transaction in addition to the third cryptogram.

In block 804, the processor of the payment processing computer (e.g., payment processing computer 180) may remove the bits of characters of the second cryptogram from the third cryptogram to produce the first cryptogram. For example, processor 502 may combine the second cryptogram with the third cryptogram using the reversible operation. The output of this combination is the first cryptogram. The second cryptogram can be generated by the payment processing computer 180 using an account identifier and a cryptographic key stored in an account database 508. Alternatively, the second cryptogram may have been previously transmitted to or generated by the payment processing computer 180 previously and stored in the account database 508. The operations in block 804 can correspond to step S5 discussed with reference to FIG. 2.

In block 806, the transceiver of the payment processing computer (e.g., payment processing computer 180) may transmit an updated authorization request message including the first cryptogram to an issuer computer. For example, the processor 502 can modify the received authorization message to replace the third cryptogram with the first cryptogram. This updated authorization response message 112 is transmitted via the communication interface 506 to the issuer computer 190 for authentication and authorization. The operations in block 806 can correspond to step S6 discussed with reference to FIG. 2

In block 808, the transceiver of a computing device of an issuer computer (e.g., issuer computer 190) may receive the updated authorization request message including the first cryptogram. For example, the communication interface 606 can receive data packets including the updated authorization request message 111.

In block 810, the processor of the computing device of an issuer computer (e.g., issuer computer 190) may compare the first cryptogram against a known credential. For example, the processor 602 of the issuer computer 190 can compare the first cryptogram to a cryptogram stored in an account database 608 in association with the user. As an alternative to storing the first cryptogram in the account database 608, can store the first cryptographic key in association with the account identifier. These credentials can be used to recreate the first cryptogram according to the first cryptographic protocol. This recreated protocol is then compared to the first cryptogram received in the updated authorization request message 111. If a match exists, then the authorization request message is authenticated. The operations in block 808 can correspond to step S7 discussed with reference to FIG. 2. The issuer computer 190 can approve or deny the payment transaction once the authorization request message has been authenticated.

In block 812, the transceiver of the computing device of an issuer computer (e.g., issuer computer 190) may transmit an approval in an authorization response message in response to determining that the first cryptogram matches the known credential. For example, the communication interface 606 may transmit data packets including an authorization response message 102 indicating that the requested payment transaction has been approved or denied and indicating whether a match in the first cryptogram exists or failed.

In another example, the payment processing computer 180 can recreate the first cryptogram and the second cryptogram and combine them to recreate the third cryptogram. The recreated third cryptogram is compared to the third cryptogram received in the authorization request message to determine if a match exists. If a match exists, then first cryptogram is transmitted to the issuer computer 190 for authentication and approval of authorization of a mobile transaction.

FIG. 9 shows a flow chart of another method 900 for performing an authorization of a mobile payment transaction using multiple cryptographic protocols, by the payment processing computer, in accordance with some aspects.

In block 902, the transceiver of the payment processing computer (e.g., payment processing computer 180) may receive the authorization request message including the third cryptogram. For example, the communication interface 506 of the payment processing computer 180 can receive data packets including the authorization request message 101 from the mobile communication device 140. The authorization request message 101 may contain information about the payment transaction such as the amount, recipient or merchant, and other information needed to process the transaction in addition to the third cryptogram In block 904, the processor of the payment processing computer (e.g., payment processing computer 180) may generate a first test cryptogram using a first test identifier in the first cryptographic key. For example, the processor 502 can use an account identifier and a cryptographic key stored in the account database 508 to generate a first test cryptogram. If the account identifier is the same as the first identifier and the cryptographic key is the same as the first cryptographic key, then the resulting cryptogram will be the same as the first cryptogram. The operations in block 904 correspond to step S21 of FIG. 3.

In block 906, the processor of the payment processing computer (e.g., payment processing computer 180) may generate a second test cryptogram using a second test identifier in the second cryptographic protocol. For example, the processor 502 can use another account identifier and another cryptographic key stored in the account database 508 to generate a second test cryptogram. If the account identifier is the same as the second identifier and the cryptographic key is the same as the second cryptographic key, then the resulting cryptogram will be the same as the second cryptogram. The operations in block 906 correspond to step S22 of FIG. 3.

In block 908, the processor of the payment processing computer (e.g. payment processing computer 180) may combine the first test cryptogram and a number of characters of the second test cryptogram equal to a length of the first test cryptogram to generate a third test cryptogram. The processor 502 can combine the first test cryptogram and the second test cryptogram using the reversible operation. The result is a third test cryptogram. If the reversible operation used to combine the test cryptograms is the same as that used to combine the first and second cryptograms then the third test cryptogram will match the third cryptogram received in the authorization request message 101. The operations in block 908 correspond to step S23 of FIG. 3.

In block 910, the processor of the payment processing computer (e.g., payment processing computer 180) may compare the third cryptogram against the third test cryptogram. For example, the processor 502 may compare the third test cryptogram with the third cryptogram received in the authorization request message 101. The operations in block 910 also correspond to step S23 of FIG. 3.

In block 912, the transceiver of the payment processing computer (e.g., payment processing computer 180) may transmit an approval in an authorization response message in response to determining that the third cryptogram matches the third test cryptogram. For example, the processor 502 can generate an authorization response message 102 indicating that the authorization request message has been authenticated and approved.

V. Example Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems are interconnected via a system bus. Additional subsystems such as a printer, keyboard, storage device(s), monitor (e.g., a display screen, such as an LED), which is coupled to display adapter, and others are shown. Peripherals and input/output (I/O) devices, which couple to I/O controller, can be connected to the computer system by any number of means known in the art such as input/output (I/O) port (e.g., USB, FireWire®). For example, I/O port or external interface (e.g. Ethernet, Wi-Fi, etc.) can be used to connect computer system to a wide area network such as the Internet, a mouse input device, or a scanner. The interconnection via system bus allows the central processor to communicate with each subsystem and to control the execution of a plurality of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure.

The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
generating, by a mobile communication device, a first cryptogram using a first identifier and a first cryptographic key, the first cryptographic key being associated with a first cryptographic protocol and being compatible to be stored in a memory of the mobile communication device, wherein the first cryptographic key is stored in the memory and the first cryptogram has a first length;
generating, within a key store of the mobile communication device, a second cryptogram using a second identifier and a second cryptographic key, the second cryptographic key being associated with a second cryptographic protocol and being compatible to be stored in the key store, wherein the second cryptographic key is incompatible to be stored in the memory, wherein the second cryptographic key is stored in the key store and is different than the first cryptographic key, the second cryptogram having a second length that is greater than the first length of the first cryptogram;
modifying the second cryptogram to generate a modified second cryptogram, the modified second cryptogram being generated by removing one or more characters from the second cryptogram in accordance with a pattern, the modified second cryptogram having a length equal to the first length of the first cryptogram;

combining, by the mobile communication device, the first cryptogram and the modified second cryptogram to generate a third cryptogram, wherein the combining comprises applying a reversible logical operation to the first cryptogram and a number of characters of the modified second cryptogram; and transmitting, by the mobile communication device, the third cryptogram in an authorization request message to a payment processing computer.

2. The method of claim 1, further comprising:

receiving, by the payment processing computer, the authorization request message including the third cryptogram;

removing, by the payment processing computer, characters of the second cryptogram from the third cryptogram to produce the first cryptogram; and transmitting, by the payment processing computer, an updated authorization request message including the first cryptogram to an issuer computer.

3. The method of claim 2, further comprising:

receiving, by the issuer computer, the updated authorization request message including the first cryptogram;

comparing, by the issuer computer, the first cryptogram against a known credential; and transmitting, by the issuer computer, to the mobile communication device, an approval in an authorization response message in response to determining that the first cryptogram matches the known credential.

4. The method of claim 1, further comprising:

receiving, by the payment processing computer, the authorization request message including the third cryptogram;

generating, by the payment processing computer, a first test cryptogram using a first test identifier and the first cryptographic key;

generating, by the payment processing computer, a second test cryptogram using a second test identifier and the second cryptographic key;

combining, by the payment processing computer, the first test cryptogram and a number of characters of the second test cryptogram equal to the first length of the first test cryptogram to generate a third test cryptogram;

comparing, by the payment processing computer, the third cryptogram against the third test cryptogram; and transmitting, by the payment processing computer, to the mobile communication device, an approval in an authorization response message in response to determining that the third cryptogram matches the third test cryptogram.

5. The method of claim 1, wherein the first cryptographic key is a triple-DES key.

6. The method of claim 1, wherein the second cryptographic key is an AES key.

7. The method of claim 1, wherein the reversible logical operation is an exclusive or (XOR).

8. A mobile communication device comprising:

a processor; and a computer readable medium coupled to the processor and containing instructions for causing the processor to perform operations comprising:

generating a first cryptogram using a first identifier and a first cryptographic key, the first cryptographic key being associated with a first cryptographic protocol and being compatible to be stored in a memory of the mobile communication device, wherein the first cryptographic key is stored in the memory and the first cryptogram has a first length;

generating, within a key store, a second cryptogram using a second identifier and a second cryptographic key, the second cryptographic key being associated with a second cryptographic protocol and being compatible to be stored in the key store, wherein the second cryptographic key is incompatible to be stored in the memory, wherein the second cryptographic key is stored in the key store and is different than the first cryptographic key, the second cryptogram having a second length that is greater than the first length of the first cryptogram;

modifying the second cryptogram to generate a modified second cryptogram, the modified second cryptogram being generated by removing one or more characters from the second cryptogram in accordance with a pattern, the modified second cryptogram having a length equal to the first length of the first cryptogram;

combining, by the mobile communication device, the first cryptogram and the modified second cryptogram to generate a third cryptogram, wherein the combining comprises applying a reversible logical operation to the first cryptogram and a number of characters of the modified second cryptogram; and transmitting the third cryptogram in an authorization request message to an authorizing entity.

9. The mobile communication device of claim 8, wherein combining the first cryptogram and the modified second cryptogram to generate the third cryptogram further comprises applying an exclusive or (XOR) function to the first cryptogram and the modified second cryptogram.

10. The mobile communication device of claim 8, wherein the first cryptographic key is a triple-DES key.

11. The mobile communication device of claim 8, wherein the second cryptographic key is an AES key.

12. A payment processing computer comprising:

a processor; and a computer readable medium coupled to the processor and containing instructions for causing the processor to perform operations comprising:

receiving, from a mobile communication device, an authorization request message including a third cryptogram, wherein the third cryptogram was generated from a first cryptogram in a first cryptographic key and a modified second cryptogram generated from a second cryptogram in a second cryptographic key combined via a reversible logical operation, wherein the first cryptographic key is associated with a first cryptographic protocol and is compatible to be stored in a memory of the mobile communication device, the first cryptographic key being stored in the memory, and wherein the second cryptographic key is associated with a second cryptographic protocol and is compatible to be stored in a key store of the mobile communication device, wherein the second cryptographic key is incompatible to be stored in the memory and is stored in the key store, the second cryptographic key being different than the first cryptographic key, and wherein the first cryptogram has a first length and the second cryptogram has a second length that is greater than the first length of the first cryptogram, wherein the modified second cryptogram has a length equal to the first length of the first cryptogram; by the mobile communication device by:

generating a first cryptogram using a first identifier and a first cryptographic key, the first cryptographic key being associated with a first cryptographic protocol and being compatible to be stored in a memory of the mobile communication device, wherein the first cryptographic key is stored in the memory and the first cryptogram has a first length;

generating, within a key store of the mobile communication device, a second cryptogram using a second identifier and a second cryptographic key, the second cryptographic key being associated with a second cryptographic protocol, wherein the second cryptographic key is incompatible to be stored in the memory, wherein the second cryptographic key is stored in the key store and is different than the first cryptographic key, the second cryptogram having a second length that is greater than the first length of the first cryptogram;

modifying the second cryptogram to generate a modified second cryptogram, the modified second cryptogram being generated by removing one or more characters from the second cryptogram in accordance with a pattern, the modified second cryptogram having a length equal to the first length of the first cryptogram; and combining the first cryptogram and the modified second cryptogram to generate the third cryptogram, wherein the combining comprises applying a reversible logical operation to the first cryptogram and a number of characters of the modified second cryptogram;

authenticating the authorization request message based on the third cryptogram; and transmitting an authorization response message to the mobile communication device.

13. The payment processing computer of claim 12, the operations of authenticating the authorization request message based on the third cryptogram further comprising:

removing characters of the second cryptogram from the third cryptogram to produce the first cryptogram.

14. The payment processing computer of claim 13, wherein the operations of removing the characters of the second cryptogram from the third cryptogram to produce the first cryptogram further comprise combining the second cryptogram and the third cryptogram with the reversible logical operation.

15. The payment processing computer of claim 13, the operations further comprise:

transmitting, to an issuer computer, an updated authorization request message including the first cryptogram; and receiving, from the issuer computer, an approval in the authorization response message in response to determining that the first cryptogram matches a known credential.

16. The payment processing computer of claim 12, wherein the operations for authenticating the authorization request message based on the third cryptogram comprises operations for:

generating a first test cryptogram using a first test identifier and the first cryptographic key;

generating a second test cryptogram using a second test identifier and the second cryptographic key;

combining the first test cryptogram and a number of characters of the second test cryptogram equal to a length of the first test cryptogram to generate a third test cryptogram;

comparing the third cryptogram against the third test cryptogram; and generating an approval in the authorization response message in response to determining that the third cryptogram matches the third test cryptogram.

17. The payment processing computer of claim 12, wherein the first cryptographic key is a triple-DES key.

18. The payment processing computer of claim 12, wherein the second cryptographic key is an AES key.

19. The payment processing computer of claim 12, wherein the reversible logical operation is an exclusive or (XOR).

* * * * *